Dec. 14, 1943.       H. McINTYRE       2,336,878
RESILIENT TIRE
Filed June 12, 1942
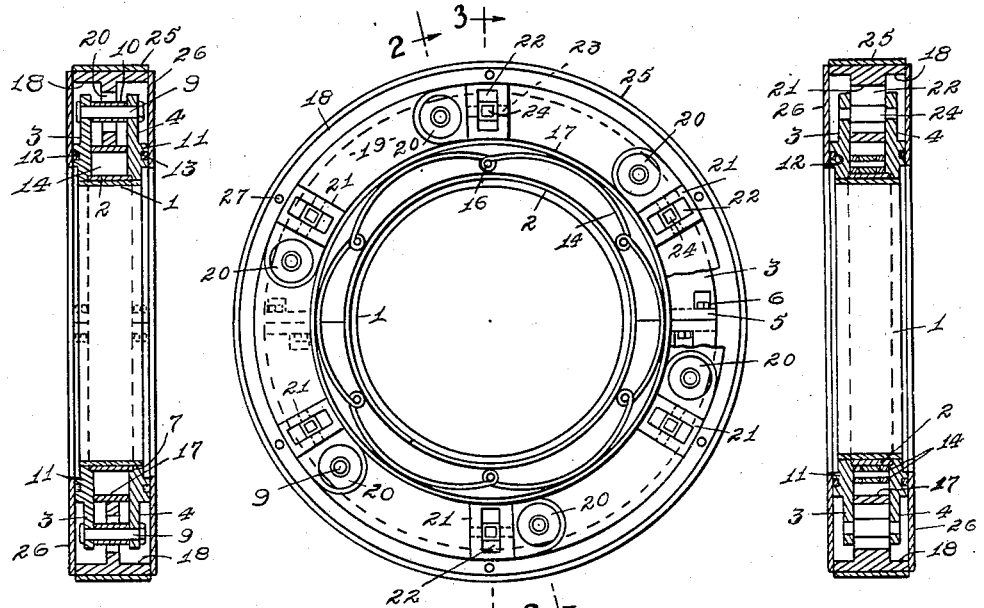
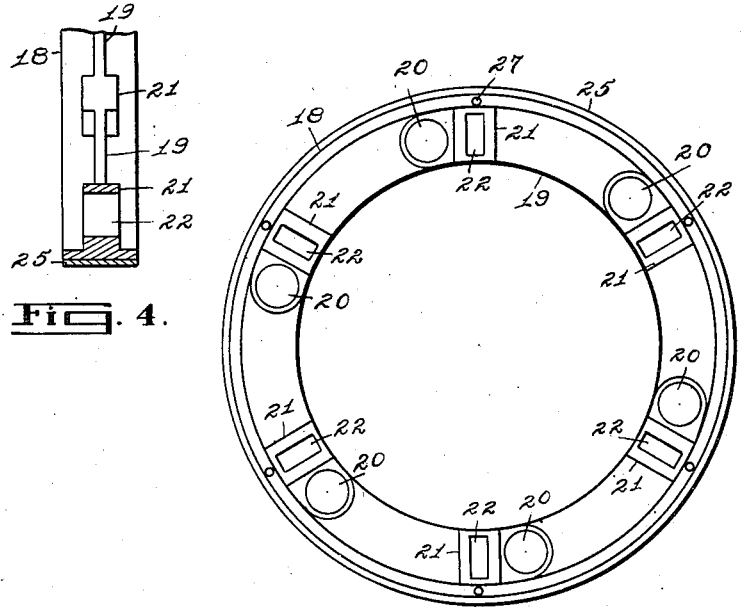
Inventor
Hugh McIntyre
BY [signature] Atty.

Patented Dec. 14, 1943

2,336,878

UNITED STATES PATENT OFFICE 2,336,878

RESILIENT TIRE

Hugh McIntyre, Kirkland Lake, Ontario, Canada

Application June 12, 1942, Serial No. 446,745

8 Claims. (Cl. 152—78)

The invention relates to improvements in resilient tires as described in the present specification and shown in the accompanying drawing that forms a part of the same.

The main object of the invention is to provide a tire for wheeled vehicles which will ensure the desired degree of resiliency without the employment of rubber or pneumatic devices.

Another object of the invention is to provide a tire which can be incorporated with any of the existing types of wheels.

A further object of the invention is to provide a resilient tire having a solid driving connection with the wheel which will at the same time permit of the proper spring movement under shock.

And generally the objects of the invention are to provide a resilient tire constructed of material readily available under existing conditions, which will be quiet in operation, easy to attach to and remove from the wheel and which can be produced at reasonable cost.

The invention consists in the novel features of construction, arrangements and combinations of parts described in the present specification and more particularly pointed out in the claims for novelty following.

In describing the invention reference will be made to the accompanying drawing, in which:

Figure 1 is a side elevation of my improved tire with the dust plate and one side of the tread carrier guide removed and a portion of the tread carrier broken away.

Figure 2 is a cross sectional view taken on the line 2—2 of Figure 1.

Figure 3 is a cross sectional view taken on the line 3—3 of Figure 1.

Figure 4 is a cross sectional view through a portion of the tread carrier.

Figure 5 is a side elevation of the tread carrier.

Figure 6 is a plan view of a portion of the spring support for the tread carrier.

Figure 7 is a diagrammatic sectional representation showing the flexible driving connection between the tread carrier and one of the guide members.

Like numerals of reference indicate corresponding parts in the various figures.

Referring to the drawing, 1 is the wheel rim which for the purposes of the present invention is made to present a plane outer surface.

A split rim 2 of slightly lesser width than the wheel rim 1 is fitted tightly over the said wheel rim in the transverse centre thereof, the split in the rim 2 permitting same to be sprung over the wheel rim.

3 and 4 are the tread carrier supports, or guides, which are mounted peripherally of the wheel rim 1 at opposite sides thereof and extend therefrom in spaced parallel relation to one another and provide therebetween a straight walled channel around the periphery of the wheel in which a portion of the tread carrier operates under the influence of the springs, as will be described in detail hereinafter.

Each of the members 3 and 4 comprises two parts, semi-circular in shape, which when assembled provides an annular disc-like flange at each side of the wheel rim.

Each of the sections of each tread carrier support is provided with a lateral flange 5 at each end thereof whereby when the sections of a carrier support are placed together around the wheel rim to form a complete ring the flanges from the two sections will abut one another and these flanges are securely locked together over the wheel rim by means of bolts 6.

Each of the members 3 and 4 has its inner corner cut away to provide opposed annular recesses 7 adapted to receive the corresponding side edges of the base rim 2. This interlocking engagement between the tread carrier supports and the base rim 2 prevents movement of the inner or lower edges of the said supports and also prevents opening movement of the split rim.

The members 3 and 4 are held to their proper relative positions at their outer edges by means of a circumferential series of bolts 9 passing through the opposed members and through spacer bushings 10 positioned between the said members.

Each of the tread carrier supports 3 and 4 is provided on its outer side with an annular rib 11 and each of the said ribs is preferably provided with an annular groove 12 for the reception of a pad 13 of felt or other like material.

14 is an endless spring operating within the channel formed between the parallel members 3 and 4, said spring comprising a series of arched links of flat spring metal linked together at their ends, as at 16, to form an endless chain of links. The links are so arranged that the ends thereof bear against the base rim 2 and the arched portions extend outwardly away from said base rim.

The tread carrier comprises an annular rim 18 of somewhat greater diameter than the members 3 and 4 and of the width desired to carry a sufficient road tread, said tread carrier having a central inwardly extending narrow flange 19 extending into the channel formed between said members 3 and 4 and having a rim 17 in engagement with the linked spring 14 whereby in the absence of pressure on the said rim 18 the latter will be held concentric with the wheel. The flange 19 is of such depth that the rim of the tread carrier will at all times be spaced from the outer edges of the guide members 3 and 4.

The flange 19 is provided at intervals therearound with openings 20 through which the bolts 9 and their bushings 10 extend and such openings are of sufficiently greater diameter than said bushings to permit of free movement of the tread carrier under the varying influence of the load.

It will thus be apparent that in the absence of pressure due to shock on the periphery of the tread carrier the said tread carrier will assume a position concentric to the wheel but when pressure is applied to said tread carrier, as in the case of the wheel operating over an irregular road surface, the said tread carrier will be moved inwardly at the point of pressure against the influence of the aligned link, or links, of the spring 14, causing said link, or links, to be spread and as such pressure is released the link, or links, will spring back to an arched position and force the tread carrier outwardly to its proper position, the enlarged openings 20 in the flange 19 permitting free radial as well as slight circumferential movement of said tread carrier.

It is imperative that connecting means be provided between the tread carrier and the wheel which will insure that the tread carrier be driven with the wheel but which will at the same time permit of such radial and circumferential movement of the tread carrier as is necessary to allow same to take up shocks and transfer them to the linked springs and to this end the flange 19 of the tread carrier is provided at equi-spaced intervals therearound with enlargements 21 constituting guide blocks, preferably of a width to slidably fit between the members 3 and 4 whereby they will serve as a means to prevent lateral movement of the tread carrier.

The guide blocks are each provided with a slot 22 extending radially in respect to the wheel hub. The driving guide members 3 and 4 are each provided with a series of tangential slots 23 in co-operative alignment with the respective radial slots 22 at substantially the longitudinal centres of the latter and through each radial slot 22 in the tread carrier flange and the registering pair of tangential slots 23 in the members 3 and 4 is extended a driving block, or pin, 24 which is adapted to slidably fit the right angularly related slots 22 and 23 and thereby permit of limited universal movement of the tread carrier under shock but at the same time causing same to be driven by the wheel.

If desired the tangential slots 23 in the members 3 and 4 may be made slightly narrower than the radial slots 22 in the tread carrier flange and the driving blocks 24 can be reduced accordingly towards each of their ends whereby the central portion of each driving block will be slightly larger than the end portions which slide in the tangential slots whereby to prevent longitudinal movements of said driving blocks.

A tread member 25 composed of a suitably tough and long wearing fabric, preferably of woven construction, is secured over the rim 18 by riveting or otherwise, to provide the required surface friction and to reduce noise.

Dust plates 26 in the form of annular discs are secured over the respective sides of the wheel to the corresponding edges of the tread carrier rim 18 by rivets 27 or other fastening means and extend inwardly across the side flanges 11 of the members 3 and 4 and bear against the corresponding felt packing elements 13 whereby to prevent dust or other foreign matter reaching the interior parts.

In the operation of this invention the spring 14 under the load and in the absence of shock holds the tread carrier concentric with the wheel but in the event of a shock, such as when the wheel is operating over an uneven surface, the tread carrier is forced inwardly at the point of impact against the aligned link, or links, to spread outwardly and take the shock. As the openings 20 are larger than the bolts 9 and their bushings 10 connecting the members 3 and 4 and as the drive blocks 24 are slidable in the guide blocks 21 the tread carrier flange is free to move inwardly and outwardly in the channel formed by the members 3 and 4 under the alternate influence of the shock and the return movement of the spring links. Limited circumferential movement of the tread carrier is also permitted by reason of the fact that the ends of the drive blocks are extended into the tangential slots 23 in the members 3 and 4. These blocks take the drive from the guides to the tread carrier and provide a universal drive in all positions of the tread carrier. The linked springs are free to move in any direction so that a depressed set of spring links on one side causes a lifted set on the opposite side and so keep the tread carrier constantly held. These springs also keep the drive blocks in position and further effectually act to prevent rattle.

While I have illustrated and described the present preferred forms of construction for carrying out my invention, this is capable of variation and modification without departing from the spirit of my invention. I, therefore, do not wish to be limited to the precise details of construction set forth, but desire to avail myself of such variations and modifications as come within the scope of the appended claims.

What I claim as my invention is:

1. In a resilient tire, in combination with a wheel rim, a pair of annular driving guides mounted on the periphery of said wheel rim in spaced parallel relation to one another and rotatable with said wheel rim, a split base rim encircling said wheel rim between said driving guides, cross members in annular series connecting the opposed driving guides at or near their outer edges, a tread carrier comprising a rim encircling said driving guides in spaced relation thereto and a central annular flange extending into the space between said driving guides, said flange being provided with openings through which said cross members pass, the diameters of such openings being greater than those of said cross members whereby to permit radial and circumferential movement of said tread carrier, means constituting a driving connection between said tread carrier and said driving guides and permitting limited radial and circumferential movement of said tread carrier, and spring means positioned between said flange and said base rim for absorbing shock applied to said tread carrier.

2. In a resilient tire, in combination with a wheel rim, a pair of annular driving guides mounted on the periphery of said wheel rim in spaced parallel relation to one another and rotatable with said wheel rim, a split-base rim encircling said wheel rim between said driving guides, cross members in annular series connecting the opposed driving guides at or near their outer edges against lateral movement, a tread carrier comprising a rim encircling said driving guides in spaced relation thereto and a central annular flange extending into the space between said driving guides, said flange being provided with openings through which said cross members pass, the diameters of such openings being greater than those of said cross members whereby to permit radial and circumferential movement of said tread carrier, means constituting a driving connection between said tread carrier and said driving guides and permitting limited radial and circumferential movement of said tread carrier, and spring means comprising a series of arched links of spring metal pivotally connected at their ends encircling said base rim within said flange from said tread carrier for absorbing shock applied to said tread carrier.

3. A resilient tire according to claim 2 in which the connected ends of said spring links bear against said base rim and the arched portions of said links extend outwardly toward the said flange.

4. A resilient tire, in combination with a wheel rim, a pair of annular driving guides mounted on the periphery of said wheel rim in spaced parallel relation to one another and rotatable with said wheel rim, a split base rim encircling said wheel rim between said driving guides, cross members in annular series connecting the opposed driving guides at or near their outer edges against lateral movement, a tread carrier comprising a rim encircling said driving guides in spaced relation thereto and a central annular flange extending into the space between said driving guides, said flange being provided with openings through which said cross members pass, the diameters of such openings being greater than those of said cross members whereby to permit radial and circumferential movement of said tread carrier, said flange also having an annular series of enlargements slidably fitting between said driving guides, said enlargements each having a radial slot therein, said driving guides each having an annular series of tangential slots aligned with said radial slots, driving blocks extending through the respective radial slots and the opposed aligned tangential slots in said driving guides whereby to provide a driving connection between said tread carrier and said driving guides allowing limited radial and circumferential movement of said tread carrier, and compressible spring means positioned between said base rim and said flange for absorbing shock applied to said tread carrier.

5. In a resilient tire, in combination with a wheel rim, a housing comprising a base plate and parallel side members extending peripherally of said wheel rim and rotatable therewith, a tread carrier encircling said housing in spaced relation thereto and having a part slidable within said housing, that part of said tread carrier which extends into said housing having a series of radial slots extending transversely therethrough, said side members each having a series of tangential slots in opposed pairs, the opposed tangential slots crossing the aligned radial slots at opposite sides of the latter, driving blocks extending loosely through each radial slot and the registering tangential slots whereby to provide a flexible driving connection between the tread carrier and the housing, spring means positioned between said tread carrier and the said base plate for absorbing shock to said tread carrier and returning said tread carrier to its normal position, an annular packing element secured over the outer surface of each of said side members, and dust plates secured to said tread carrier at opposite sides thereof and extending inwardly across said packing elements to retain lubricant and exclude dust.

6. A resilient tire according to claim 5, in which said side members of said housing are each provided with a sliding annular surface on which the dust plates have a slidable fit and each of such surfaces is provided with an annular groove adapted to receive a packing element.

7. In a resilient tire, in combination with a wheel rim, a pair of annular driving guides secured to the wheel rim over the periphery thereof and extending outwardly in spaced parallel relation to one another, a base rim encircling said wheel rim between said driving guides, a tread carrier encircling said driving guides in spaced relation thereto and having a central annular flange extending into the space between said driving guides, said flange having a series of equi-distant radial slots thereacross, said driving guides each having a series of tangential slots registering with the respective radial slots in said flange, driving blocks extending through the respective radial slots in said flange and through the aligned tangential slots in said driving guides whereby to take the drive from said driving guides to the tread carrier and providing a universal drive in all positions of the tread carrier, and a series of linked arched springs positioned between said base rim and said tread carrier flange, said springs being movable in any direction whereby depression of a set of springs on one side due to pressure against the periphery of the tread carrier causes a lifted set on the opposite side.

8. In a resilient tire, in combination with a wheel rim, a housing comprising a base plate and upstanding side walls extending peripherally of said wheel rim and rotatable therewith, a tread carrier encircling said housing in spaced relation thereto and having a part slidable within said housing, that part of said tread carrier which extends into said housing having a series of radial slots extending transversely therethrough, the walls of said housing each having a series of tangential slots in opposed pairs, each opposed pair of which tangential slots crosses one of said radial slots at opposite sides of the latter, driving blocks slidably extending through each radial slot and the registering pair of tangential slots whereby to provide a flexible driving connection between the tread carrier and the housing, and spring means positioned between said tread carrier and the base plate for absorbing shock to said tread carrier and returning same to its normal position.

HUGH McINTYRE.